Figure 3:
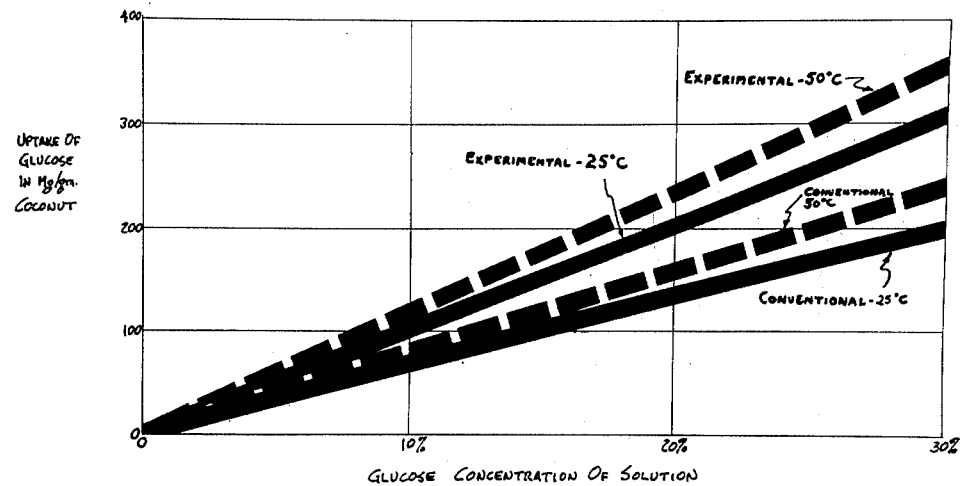

Dec. 15, 1959   R. J. LA ROCCA ET AL   2,917,746
COCONUT PRODUCTS AND TECHNIQUE FOR PRODUCING THE SAME
Filed Dec. 4, 1958                    2 Sheets-Sheet 1
FIG. I.
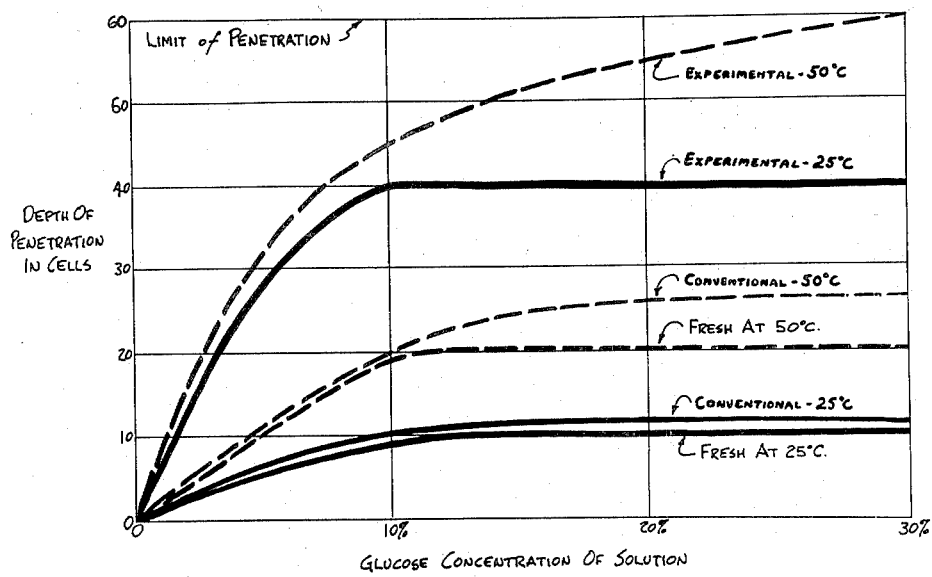
FIG. 2.
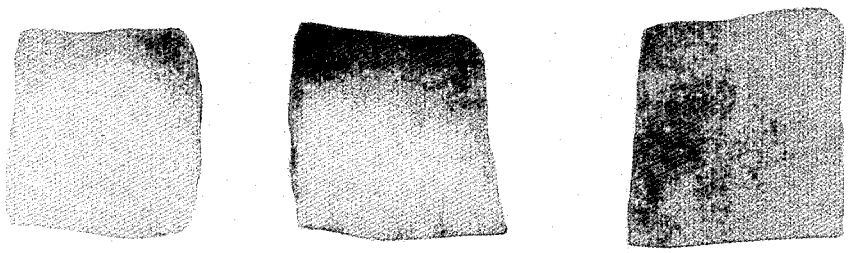
A    B    C
INVENTORS
RUDOLPH J. LaROCCA
ANATOLE SARKO
BY Frederick F. Mack and
Sidney M. Hones
ATTORNEYS

United States Patent Office 2,917,746
Patented Dec. 15, 1959

2,917,746

COCONUT PRODUCTS AND TECHNIQUE FOR PRODUCING THE SAME

Rudolph J. La Rocca, Dumont, N.J., and Anatole Sarko, Irvington on Hudson, N.Y., assignors to General Foods Corporation, White Plains, N.Y., a corporation of Delaware Application December 4, 1958, Serial No. 778,263

10 Claims. (Cl. 99—125)

This invention relates to new coconut products having improved tenderness, flavor, and appearance and to a method of producing the same.

Fresh coconut meat is generally considered the most desirable form of coconut, although its taste may be considerably enhanced by subsequent flavoring processes. Fresh coconut meat consists of radially arranged, generally six-sided, closely packed individual cells which have fairly rigid cell walls and organized cell contents. The cell contents appear to consist of an oily protoplasm containing colloidal and proteinaceous material. The average water content of fresh coconut may be 50%.

Conventionally dried coconut is usually prepared by shredding and then dehydrating fresh coconut to about 2–5% moisture in a circulating hot air dryer. Coconut so-dried has cell walls which are warped, uneven, and broken in places; cell contents are agglomerated and deposited on the cell walls and/or clumped at the ends of the cell.

The dried coconut is usually shipped from the point of origin in this dehydrated or dried form to the point of use. Thereafter, the dehydrated coconut may be rehydrated usually to about 12–15% moisture, combined with other materials, such as sugar, salt, and the like, and packaged. Although such processed or reconstituted coconut products enjoy considerable success, they do not resemble fresh coconut to the desired extent with respect to tenderness, flavor, and appearance.

The usual dehydrating step in processing coconut has an adverse effect on both the cell walls and the cell contents of the coconut which is only partially corrected (if at all) in the subsequent coconut processing. Thus, although the cells of the rehydrated processed coconut may take up some water, the cell contents remain generally coagulated and collected on the cell wall to such an extent that no emulsion is recreated comparable to that found in fresh coconut meat.

Attempts have been made to impart more desirable characteristics to dried coconut by employing various modifications of drying processes which have been successful with other foods. For example, it has been proposed to quickly freeze food so as to puncture the cell wall before drying. Operation in accordance with such teaching gives an undesirable product which is not capable of extended storage and which cannot be readily reconstituted. Another illustrative prior art process requires high temperatures for dehydration of foods. None of the prior art processes, when applied to coconut, has permitted attainment of a dried product which is considered completely satisfactory with respect to its tenderness, flavor, appearance, storage life, and reconstitutability.

It is an object of this invention to provide novel forms of coconut. A further object of this invention is to disclose a process according to which the new coconut products of this invention may be prepared. Other objects will be apparent to those skilled in the art on inspection of the following description.

It has now been discovered that dehydrated coconut products, in chunks, shreds, or any other suitable form, may be prepared which are more tender, whiter, and fluffier, and which possess a highly desirable flavor which endures over an extended storage life. Sections of coconut meat dried in accordance with this invention reveal a condition quite different from that observed in conventionally dehydrated coconut. The cell contents remain well distributed and closely resemble the cell contents existing in fresh coconut. The cell walls are unbroken and are substantially straight and unwarped. Water content may be 5% or less by weight, corresponding to less than about 10% of the water originally present.

According to certain aspects of this invention, coconut meat may be subdivided into chunks or shreds and subjected to preliminary treatment which may include washing. The material is then slowly frozen, preferably at atmospheric pressure, at temperature which may be as high as 32° F., but which preferably is 0° F. to 15° F. Freezing may be effected in about 6–18 hours, but preferably in at least about 12 hours. Slow freezing under the preferred conditions of 0° F. to 15° F. for 12–18 hours permits attainment of a frozen product which can be readily freeze-dried with minimum damage to cell walls and contents.

To effect freeze drying of the frozen coconut chunks or shreds, they may be placed on trays in layers which, for most satisfactory results, are preferably not more than about 0.5–0.75 inch thick. When the coconut is in the form of cubes or chunks, a single layer will preferably be used. Drying is accomplished by maintaining the pressure at less than about 100 microns and preferably in the range of 20–100 microns. During the drying period of 10–32 hours, preferably 18–24 hours, the coconut is maintained under substantially adiabatic conditions. Temperature may drop by about 10° F. to 20° F., preferably 15° F., to a final temperature of minus 20° F. to plus 5° F., and preferably to about 0° F. Adiabatic drying will be continued until the moisture content of the coconut is less than about 1%, although if desired operations may be conducted to give a product containing 1%–10% moisture.

The dehydrated coconut product of this invention comprises a plurality of coconut cells each having essentially unbroken cell walls substantially the same as in fresh undehydrated coconut, and within each cell a body of substantially evenly distributed and uncoagulated cell contents containing less than about 10% of the water content of a fresh coconut cell.

The dehydrated coconut product is particularly characterized by its adaptability to rehydration on contact with reconstituting liquids including water or aqueous solutions containing sweetening agents such as sugar, e.g. glucose, alone or together with other additives e.g. glycols. Its unbroken cell walls and substantially undisturbed cell contents permit rapid reconstitution to give a product which possesses the desirable attributes of fresh coconut. The dehydrated coconut is also characterized by ability to be stored for extended periods of time, e.g. 12 months or longer, without loss of original characteristics and without deterioration.

As is well known to those skilled in the art, prevailing practice in the frozen food field calls for rapid freezing of foods. This is based on a large body of knowledge which has uniformly found that if food be slowly frozen the large crystals of ice penetrate and perforate the cell walls and destroy the structure and texture of the product; on the other hand, it has been consistently found that rapid freezing produces a much smaller crystal size which permits attainment of a product which resembles the raw material. Accordingly, it is quite unexpected to find that slow freezing of coconut, in accordance with this invention, gives a product which very closely resembles fresh coconut.

According to a specific example of the process of this invention, fresh domestic coconuts were peeled, washed, and chopped into pieces having dimensions of approximately 0.25" x 0.25" x 0.5". Moisture content of the pieces averaged about 50%. The coconut was placed in trays in layers averaging about 0.75" in depth, and permitted to stand overnight (i.e. about 16 hours.) in a cold room maintained at about 0° F.

The frozen particles of coconut were then placed in a Stokes vacuum chamber and subjected to an average vacuum of about 50–80 microns. During the drying period of about 24 hrs., the temperature of the frozen coconut adiabatically dropped from about 0° F. to about minus 10° F. At the end of the evaporation, the coconut was brought to room temperature and pressure, and tested. Moisture content of the product dehydrated coconut was 1%.

The dehydrated product was found to have substantially unbroken cell walls, was of lighter density than the fresh coconut, and was crisp and crunchy on being chewed. It was whiter and fluffier and had a more pleasant nut-like flavor than conventionally dried coconut.

Tests were performed to demonstrate the high adsorptivity of the dehydrated product, as evidenced by the great depth of liquid penetration when samples are immersed in e.g. glucose solutions. In these tests, cubes were prepared from (a) fresh coconut, (b) a conventionally dried coconut, and (c) a coconut dried according to this invention. In each of the tests, one cube was soaked for ten minutes in a 5 ml. aliquot of glucose solution containing either 10%, 20%, or 30% by weight of glucose. In some tests, the temperature was maintained at 25° C. and in others at 50° C.

The cubes were withdrawn from solution, washed, and soaked in 0.2 N silver nitrate for 2 minutes. This was followed by immersion for 1–2 minutes in 0.2 N sodium hydroxide. The silver oxide formed was reduced to metallic silver by the action of the aldehyde group of the glucose. Washing with ammonia water for 2–3 minutes dissolved the unreduced silver oxide, but left the metallic silver, the dark color of which indicated the penetration of glucose solution into the coconut.

In each case it was noted that the glucose solution penetrated into the coconut cubes substantially entirely from the tender side i.e. that side which corresponded to the innermost portion of the coconut. Fig. 1 of the drawing shows the depth of penetration of glucose solutions at 25° C. and 50° C. into cubes having a depth of 60 cells (this being the usual thickness of coconut meat found in coconuts) of (a) fresh coconut; (b) coconut which has been dried by conventional procedures; and (c) coconut which has been experimentally dried in accordance with the process of this invention.

As is apparent from inspection of Fig. 1, the penetration of glucose solution into the product of this invention was 2–4 times that of the conventionally dried product, and 3–4 times that of fresh coconut. Furthermore, the new dehydrated product of this invention was the only one wherein there was complete penetration by the glucose solution, as shown by the 50° C. "Experimental" curve. Reconstituted coconut prepared from the dehydrated coconut product of this invention, e.g. by contact with 30% glucose solution at 50° C., is similar in appearance and in cell structure to fresh coconut.

Fig. 2 shows the specific results obtained by contacting (A) fresh coconut, (B) conventionally dried coconut, and (C) the dehydrated coconut of this invention with 30% glucose solutions at 50° C. followed by the above-described silver nitrate testing procedure. As is apparent from the darkened areas which represent glucose penetration, the product of this invention is characterized by complete penetration of and saturation by the glucose solution. The fresh and conventionally dried product had absorbed much less glucose solution.

Fig. 3 shows total uptake of glucose from aqueous solutions for conventionally dried coconut and the coconut of this invention. The uptake of glucose in milligrams per gram of coconut, when the latter is immersed in glucose solutions for 10 minutes at 25° C. and 50° C., is seen to be about 50% higher for the coconut product of this invention than for the conventional dried product. For example, at 25° C. after 10 minutes in 30% solution, the new product had absorbed about 300 milligrams of glucose per gram of coconut, whereas the conventional product had an uptake of only about 200 milligrams of glucose per gram of coconut.

Figure 4:
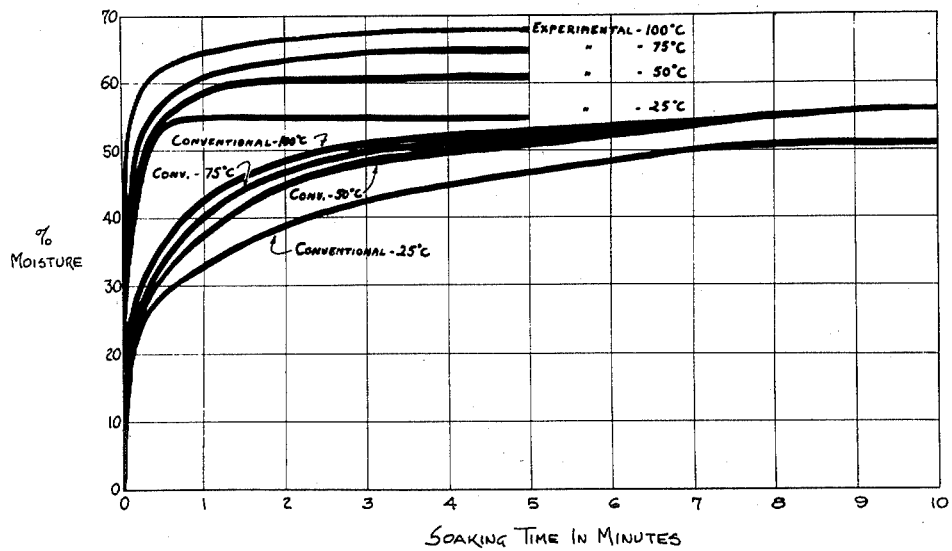

The dehydrated coconut product of this invention is also characterized by a high rate of hydration. As shown in Fig. 4, the time to reach maximum attained moisture for the new product may be as little as 5–10% of the time required for the conventional product. For example, at 25° C., the new product reached maximum moisture content after about 40 seconds; the conventional product reached its maximum after about 9 minutes. Furthermore the maxima at all temperatures are higher for the new product than for the conventional product.

The dehydrated product of this invention was found to have substantially unbroken cell walls. It was of lighter density than fresh or conventionally dried coconut. When chewed, it was crisp, crunchy, and tasty, and it had a nut-like flavor. It was capable of being stored for an extended period of time.

This dehydrated product may be readily reconstituted as by combination with reconstituting liquid, e.g. water or aqueous solution of sweetening agents such as sugar etc. to yield an improved product characterized by desired texture, flavor, and appearance, which more closely resembles fresh coconut than does reconstituted conventionally dried product.

It will be apparent to those skilled in the art that although the invention has been described in terms of a specific example, various modifications and changes may be made which fall within the scope of the invention.

This application is a continuation-in-part of application Serial No. 597,615, filed July 13, 1956, now abandoned, the inventors of which are Rudolph J. La Rocca and Anatole Sarko.

What is claimed is:

1. A dehydrated coconut product comprising a plurality of coconut cells having essentially unbroken cell walls substantially the same as in fresh undehydrated coconut, and within each cell a body of substantially evenly distributed and uncoagulated cell contents containing less than about 5% by weight of water, said dehydrated coconut being produced by the process which comprises adiabatically drying slowly frozen coconut meat under vacuum.

2. A reconstituted coconut product having a moisture content approaching that of fresh coconut comprising a plurality of coconut cells having essentially unbroken cell walls substantially the same as in fresh coconut, and within each cell a body of evenly distributed and uncoagulated cell contents containing reconstituting liquid, said reconstituted coconut being preared by the process of adiabatically drying slowly frozen coconut meat under vacuum and then contacting said dehydrated coconut with a reconstituting liquid.

3. A reconstituted coconut product as claimed in claim 2 wherein the reconstituting liquid is an aqueous solution of sugar.

4. The method of preparing a dehydrated coconut product which comprises adiabatically drying slowly frozen coconut meat under vacuum.

5. The method of preparing a dehydrated coconut product which comprises slowly freezing fresh coconut meat and adiabatically drying the same under vacuum.

6. The method of preparing a dehydrated coconut product which comprises slowly freezing fresh coconut meat and adiabatically drying the same under vacuum less than about 100 microns.

7. The method of preparing a dehydrated coconut product which comprises slowly freezing fresh coconut meat and adiabatically drying the same under vacuum of 20–100 microns.

8. The method of preparing a dehydrated coconut product which comprises slowly freezing fresh coconut meat and adiabatically drying the same under vacuum of 20–100 microns for 10–32 hours whereby the temperature of said coconut drops by 10° F. to 20° F. during said drying.

9. The method of preparing a dehydrated coconut product which comprises freezing fresh coconut meat at 0° F. to 32° F. for 6–18 hours and adiabatically drying the frozen coconut meat under vacuum for 10–32 hours whereby the temperature of said coconut drops by 10° F. to 20° F. during said drying.

10. The method of preparing a dehydrated coconut product which comprises freezing fresh coconut meat about 0° F. for 12–18 hours, and adiabatically drying the frozen coconut meat under vacuum for 18–24 hours whereby the temperature of said coconut meat drops by about 15° F. during said drying.

References Cited in the file of this patent

UNITED STATES PATENTS

| | | |
|---|---|---|
| 2,147,752 | Northcutt | Feb. 21, 1939 |
| 2,583,697 | Hendry et al. | Jan. 29, 1952 |
| 2,631,104 | Welker et al. | Mar. 10, 1953 |

FOREIGN PATENTS

| | | |
|---|---|---|
| 539,477 | Great Britain | Sept. 12, 1941 |